United States Patent
Anderson

(10) Patent No.: US 7,173,631 B2
(45) Date of Patent: Feb. 6, 2007

(54) FLEXIBLE ANTIALIASING IN EMBEDDED DEVICES

(75) Inventor: Michael Hugh Anderson, Levcadis, CA (US)

(73) Assignee: Qualcomm Incorporated, San Diego, CA (US)

( * ) Notice: Subject to any disclaimer, the term of this patent is extended or adjusted under 35 U.S.C. 154(b) by 198 days.

(21) Appl. No.: 10/949,607

(22) Filed: Sep. 23, 2004

(65) Prior Publication Data

US 2006/0061591 A1 Mar. 23, 2006

(51) Int. Cl.
*G09G 5/00* (2006.01)
(52) U.S. Cl. ........................ 345/611; 345/506; 345/519
(58) Field of Classification Search ................ 345/501, 345/506, 582, 611, 629, FOR. 156, 211, 216, 345/156, 519; 382/269
See application file for complete search history.

(56) References Cited

U.S. PATENT DOCUMENTS

| | | | | |
|---|---|---|---|---|
| 6,154,212 A * | 11/2000 | Eick et al. | ........... | 715/848 |
| 6,181,836 B1 * | 1/2001 | Delean | ........... | 382/302 |
| 6,529,207 B1 * | 3/2003 | Landau et al. | ........... | 345/619 |
| 6,559,851 B1 * | 5/2003 | Schlapp | ........... | 345/531 |
| 6,812,923 B2 * | 11/2004 | Gosalia et al. | ........... | 345/419 |
| 2003/0043169 A1 * | 3/2003 | Hunter | ........... | 345/611 |
| 2005/0017982 A1 * | 1/2005 | Kane, Jr. | ........... | 345/582 |
| 2005/0195200 A1 * | 9/2005 | Chuang et al. | ........... | 345/519 |

* cited by examiner

*Primary Examiner*—Kee M. Tung
*Assistant Examiner*—G. F. Cunningham
(74) *Attorney, Agent, or Firm*—Philip R. Wadsworth; Charles D. Brown; Timothy F. Loomis

(57) ABSTRACT

A three-dimensional (3D) graphics pipeline renders a sequence of images of 3D scenes each composed of a plural set of objects. The pipeline comprises an antialiasing over-sampling mechanism to perform for a given image, at an early stage of the pipeline, oversampling on a portion of the objects of the given image.

31 Claims, 4 Drawing Sheets

FLEXIBLE ANTIALIASING IN EMBEDDED DEVICES

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

CROSS REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

The present invention relates to application level control of hardware functionality in embedded devices. The hardware functionality involves antialiasing of three dimensional (3D) images processed by a 3D graphics pipeline with such a device. In certain respects, the present invention relates to mobile phones with such hardware functionality.

Many types of embedded devices are provided with 3D graphics pipelines that process 3D images of scenes. A given scene is composed of a collection of rendering objects (e.g., triangles). Such 3D pipelines may perform antialiasing on the image. Antialiasing involves first oversampling the image—resulting in an enhanced amount of information represented by a now more abundant set of (oversampled) pixels. The Quincunx scheme, Full-Scene Antialiasing (FSAA), the accumulation buffer, and Carpenter's A-buffer (sometimes called multisampling) are a few examples of techniques for carrying out antialiasing oversampling or enhanced sampling of a given image.

The final image is frequently rendered at the lower pre-oversampled resolution, in which case the antialiasing process is completed by weighting (e.g., averaging) the greater set of samples to produce the reduced set.

BRIEF SUMMARY OF THE INVENTION

In accordance with one embodiment, a three-dimensional (3D) graphics pipeline renders a sequence of images of 3D scenes each composed of a plural set of objects. The pipeline comprises an antialiasing oversampling mechanism to perform for a given image, at an early stage of the pipeline, oversampling on a portion of the objects of the given image. In accordance with another embodiment, the pipeline comprises an antialiasing oversampling mechanism and an antialiasing weighting mechanism. The antialiasing oversampling mechanism performs for a given image, at an early stage of the pipeline, antialiasing oversampling on at least a portion of the objects of the given image. The antialiasing weighting mechanism performs on the given image, at the early stage of the pipeline, antialiasing weighting on the portion of the given image oversampled by the antialiasing oversampling mechanism.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION OF THE INVENTION

To facilitate an understanding of the descriptions herein, definitions will be provided for certain terms. A primitive may be, e.g., a point, a line, or a triangle. A triangle may be rendered in groups of fans, strips, or meshes. An object is one or more primitives. A scene is a collection of models and the environment within which the models are positioned. A pixel comprises information regarding a location on a screen along with color information and optionally additional information (e.g., depth). The color information may be in the form of an RGB color triplet. A screen grid cell is the area of a screen that may be occupied by a given pixel. A screen grid value is a value corresponding to a screen grid cell or a pixel. An application programming interface (API) is an interface between an application program on the one hand and operating system, hardware, and other functionality on the other hand. An API allows for the creation of drivers and programs across a variety of platforms, where those drivers and programs interface with the API rather than directly with the platform's operating system or hardware.

Figure 1:
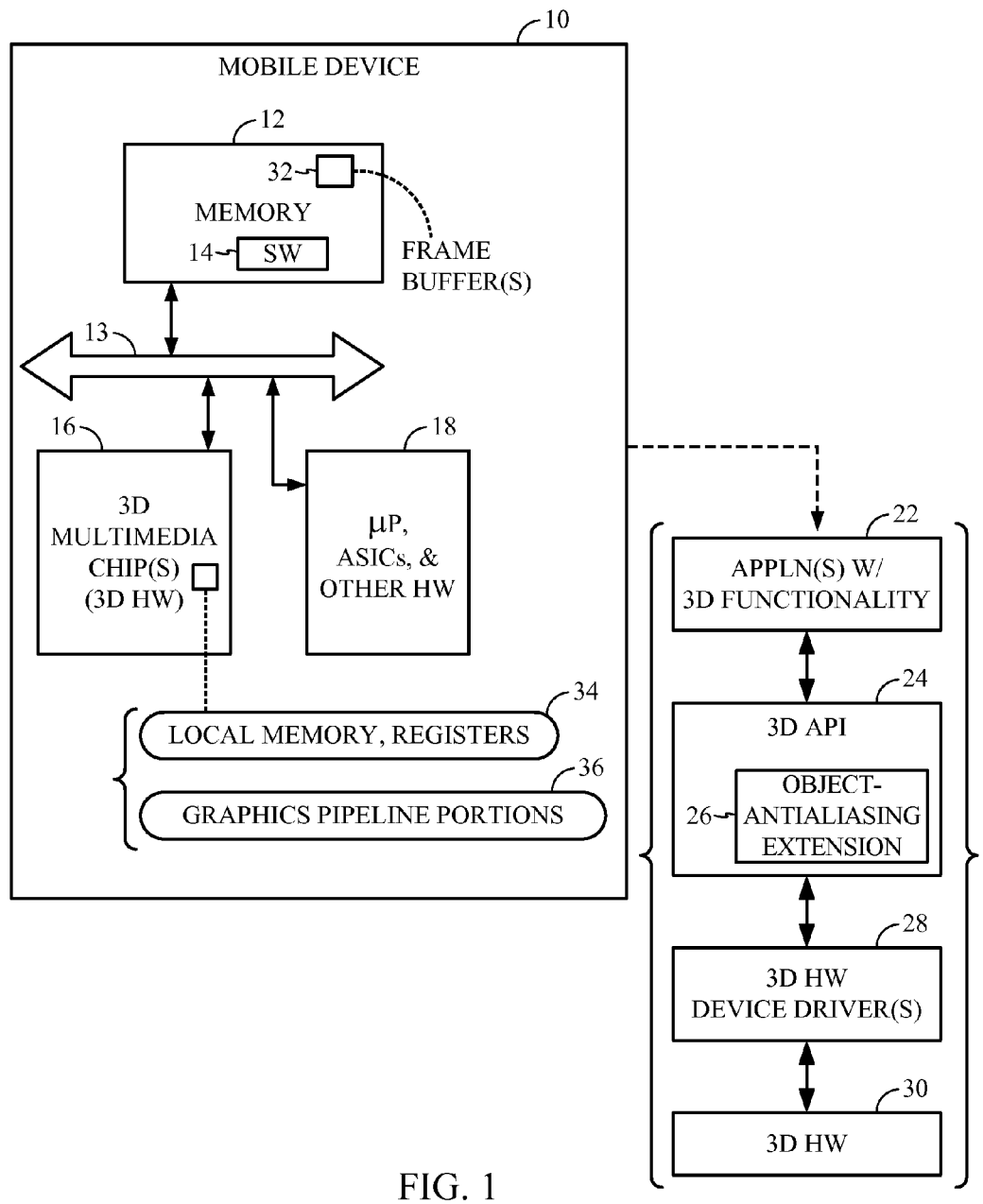
FIG. 1 is a block diagram of a mobile device in accordance with one embodiment of the present invention.

FIG. 1 is a block diagram of a mobile device 10. The illustrated mobile device 10 may comprise a wireless mobile communications device such as a mobile phone.

The illustrated mobile device 10 comprises a system memory 12 (comprising a RAM in the illustrated embodiment), a system bus 13, and software 14 (comprising an application program) in system memory 12. Device 10 further comprises 3D hardware 16 including, e.g., one or more 3D multimedia chips and other hardware 18 including a microprocessor and one or more application specific integrated circuits (ASICs). 3D hardware 16 and other hardware 18 are coupled to system memory 12 via system bus 13.

The illustrated 3D hardware 16 may comprise circuitry formed as part of an integrated circuit also common to other hardware 18, or it may comprise its own integrated circuit chip or set of chips. 3D hardware 16 comprises its own local memory and registers 34 to hold data and a graphics pipeline comprising graphics pipeline portions 36.

In terms of a hierarchy, software 14 comprises one or more applications 22 with 3D functionality that communicate with 3D hardware 30 via a 3D application programming interface (API) 24 and one or more 3D hardware device drivers 28. In the illustrated embodiment, 3D API 24 comprises, among other elements not specifically shown in FIG. 1, an object-antialiasing extension 26.

Image data is generally maintained in one or more frame buffers 32 in system memory 12. 3D hardware 16 retrieves image data from and updates image data into such frame buffers 32.

Figure 2:
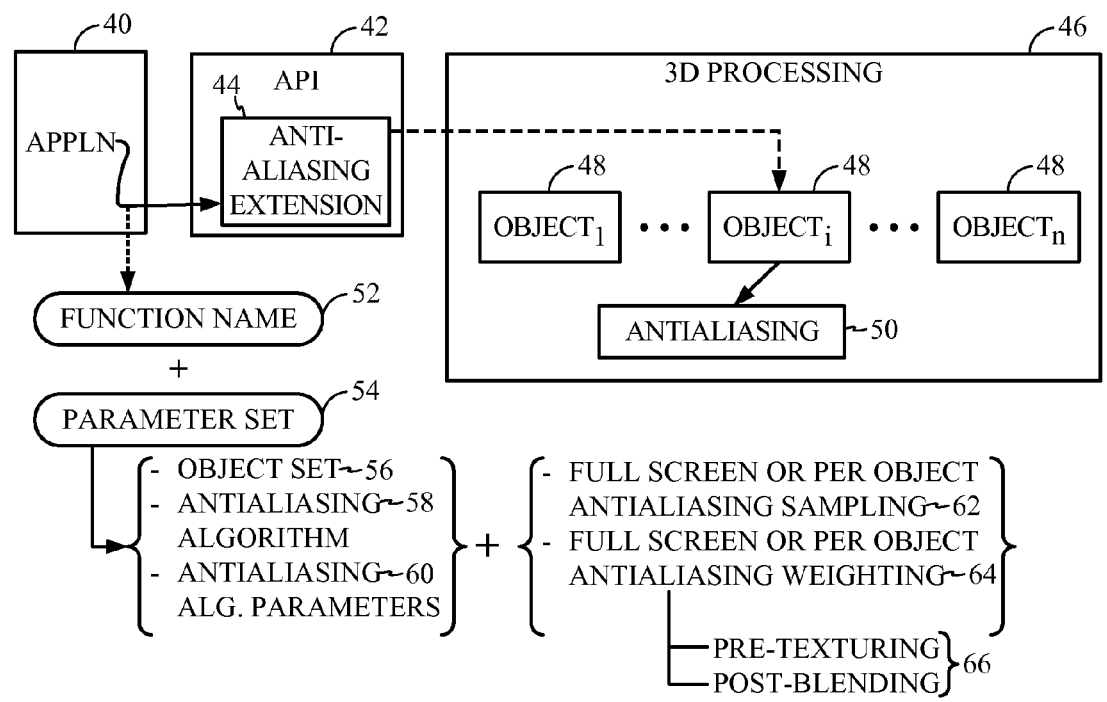
FIG. 2 is a block diagram of those mobile device entities pertaining to object antialiasing.

FIG. 2 shows an antialiasing block diagram, which depicts those entities of the illustrated mobile device that pertain to antialiasing. A given application program 40 is shown, which interacts with an API 42 by naming the function name 52 of antialiasing extension 44, and by specifying the parameter set 54 thereof.

The illustrated antialiasing extension 44 comprises a type of antialiasing application programming interface (API) function to instruct, when called by application program 40, the 3D processing portion 46 of the 3D graphics hardware (specifically the 3D graphics pipeline) to perform certain antialiasing acts. The antialiasing API function comprising a data structure to receive function name 52 and a parameter set 54 comprising antialiasing parameters, each from the application program 40. The antialiasing API function passes these antialiasing parameters received from the application program to the 3D graphics pipeline.

As shown in FIG. 2, if a given object "object$_i$" is specified for antialiasing in the parameter set 54, it is subjected to antialiasing 50 within the 3D processing portion of the system.

The parameter set may comprise an object set identification parameter 56 to identify a set of objects of a given image to be antialiased. The object set identification parameter may comprise a set of identifiers identifying individual objects from a sequence of objects making up a scene of the given image.

The parameter set may comprise a chosen type of antialiasing algorithm 58 to be employed by the pipeline, as well as parameters 60 of the chosen type of antialiasing algorithm. The parameter set may further comprise an antialiasing sampling specification parameter 62 to specify whether upon antialiasing oversampling, the oversampling is to be performed per object on a specified set of objects or is to be performed on the entire image; and the parameter set may further comprise an antialiasing weighting specification parameter 64 to specify whether upon antialiasing weighting, the weighting is to be performed per object on a specified set of objects or is to be performed on the entire image.

The parameter set may comprise a weighting timing parameter 66 to specify whether the antialiasing weighting is to be performed before a texturing portion of the pipeline or after a blending portion of the pipeline.

Figure 3:
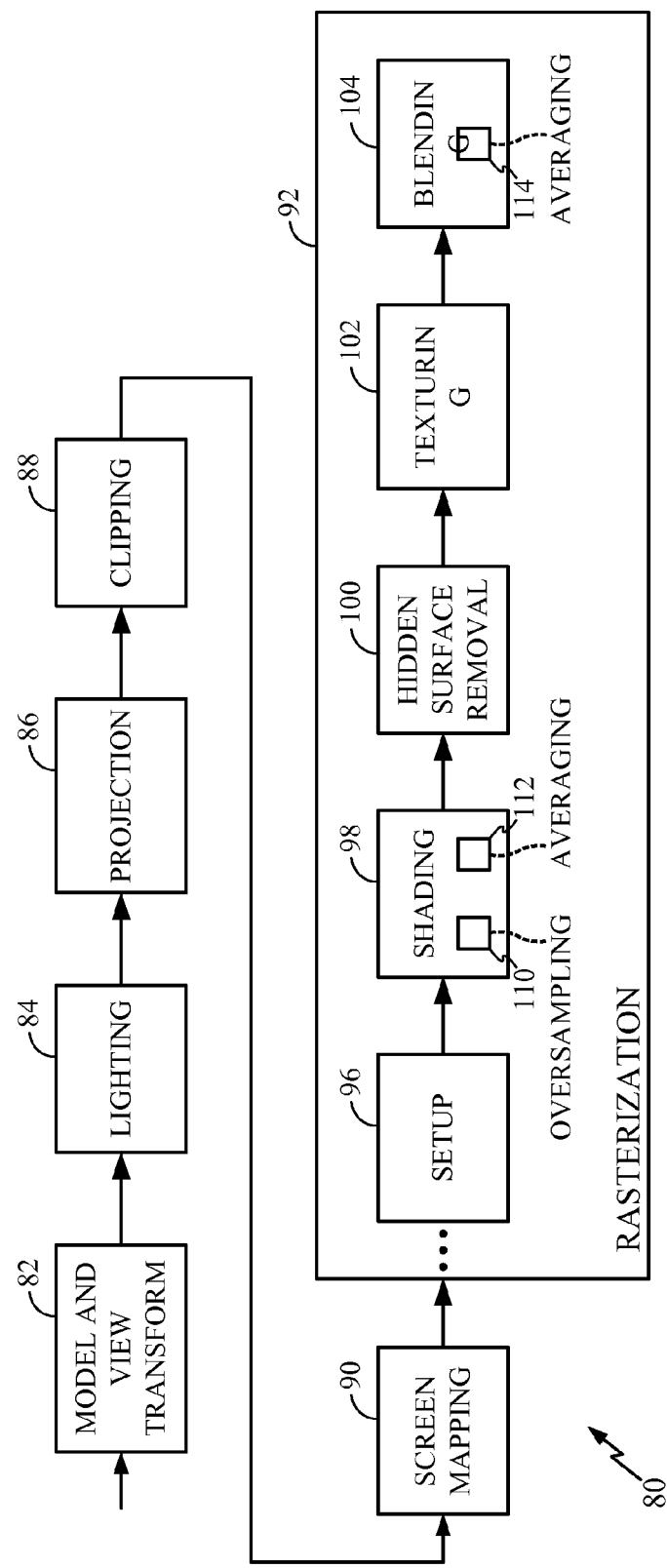
FIG. 3 is a block diagram of a 3D graphics pipeline of the mobile device illustrated in FIG. 1.

FIG. 3 is a block diagram of pertinent portions of a 3D graphics pipeline that may be employed in the mobile device 10 illustrated in FIG. 1. The illustrated pipeline 80 comprises a model and view transform stage 82, a lighting stage 84, a projection stage 86, a clipping stage 88, a screen mapping stage 90, and a rasterization stage 92. The illustrated rasterization stage 92 comprises a setup portion 96, a shading portion 98, a hidden surface removal portion 100, a texturing portion 102, and a blending portion 104.

In model and view transform stage 82, models of the depicted scene are positioned in world space and then in camera or eye space. Lighting information is added in lighting stage 84, and in the projection stage 86 the lighting modified objects are described in terms of normalized device coordinates, i.e., the three dimensional object information is converted to two dimensional information. The clipping stage 88 removes those portions of the scene that are outside a defined view volume of the scene. The projected and clipped two dimensional rendition of the scene is then mapped to the screen (in screen coordinates x and y, scaled to the size of the screen) by screen mapping stage 90. z coordinate information is also maintained for the scene.

Setup portion 96 performs computations on each of the image's primitives (e.g., triangles). These computations precede an interpolation portion (otherwise referred to as a shading portion 98 (or a primitive-to-pixel conversion stage) of the graphics pipeline. Such computations may include, for example, computing the slope of a triangle edge using vertex information at the edge's two end points. Shading portion 98 involves the execution of algorithms to define a screen's triangles in terms of pixels addressed in terms of horizontal and vertical (X and Y) positions along a two-dimensional screen. Texturing portion 102 matches image objects (triangles, in the embodiment) with certain images designed to add to the realistic look of those objects. Specifically, texturing portion 102 will map a given texture image by performing a surface parameterization and a viewing projection. The texture image in texture space (u,v) (in texels) is converted to object space by performing a surface parameterization into object space $(x_0, y_0, z_0)$. The image in object space is then projected into screen space (x, y) (pixels), onto the object (triangle).

In the illustrated embodiment, blending portion 104 takes a texture pixel color from texture portion 102 and combines it with the associated triangle pixel color of the pre-texture triangle. Blending portion 104 also performs alpha blending on the texture-combined pixels, and performs a bitwise logical operation on the output pixels. More specifically, blending portion 104, in the illustrated system, is the last stage in 3D graphics pipeline. Accordingly, it will write the final output pixels of 3D hardware 16 to frame buffer(s) 32 within system memory 12. A hidden surface removal (HSR) portion 100 is provided, which uses depth information to eliminate hidden surfaces from the pixel data. Because in the illustrated embodiment it is provided between shading portion 98 and texturing portion 102, it simplifies the image data and reduces the bandwidth demands on the pipeline.

The illustrated shading portion 98 comprises an antialiasing oversampling mechanism 110 and an antialiasing weighting mechanism 112 (an averaging mechanism as illustrated in FIG. 3). The illustrated blending portion 104 also comprises an antialiasing weighting mechanism 114 (also an averaging mechanism as illustrated in FIG. 3).

Antialiasing requires oversampling and subsequent weighting. By oversampling early in the pipeline (e.g., prior to performing hidden surface removal or texturing), while weighting later in the pipeline (e.g., in the blending portion), the quality of the rendered image can be improved. For example, this allows certain calculations to be done after the oversampling yet before weighting. Such calculations, e.g., concerning when one object touches or covers another, are more accurate with the oversampled data. However, this oversampling creates a corresponding increase in the demand on the pipeline's bandwidth (i.e., processing rate). For example, an oversampling rate of four oversampled pixels per standard pixel requires a given processing stage accessing frames from the main memory to cause four times as much data to be transferred over the system bus for every frame access.

In accordance with one embodiment, antialiasing oversampling mechanism 110 in shading portion 98 may perform for a given image, at an early stage of the pipeline, oversampling on a portion of the objects of the given image. In this embodiment, weighting is performed at weighting mechanism 114 in blending portion 104. By performing antialiasing on only a portion of the objects at such an early stage of the graphics pipeline, the processing rate demands on the pipeline are reduced.

In accordance with another embodiment, the shading portion comprises an antialiasing oversampling mechanism 110 and an antialiasing weighting mechanism 112. The antialiasing oversampling mechanism 110 performs for a given image, at an early stage of the pipeline, antialiasing oversampling on at least a portion of the objects of the given image. The antialiasing weighting mechanism 112 performs on the given image, at the early stage of the pipeline, antialiasing weighting on the portion of the given image oversampled by the antialiasing oversampling mechanism. By performing both oversampling and weighting at an early stage of the pipeline (e.g., before texturing) (the weighting reducing number of pixels to the number preceding the oversampling process), the benefits of antialiasing are achieved while the amount of data processed by later portions of the 3D graphics pipeline is kept to a minimum.

Figure 4:
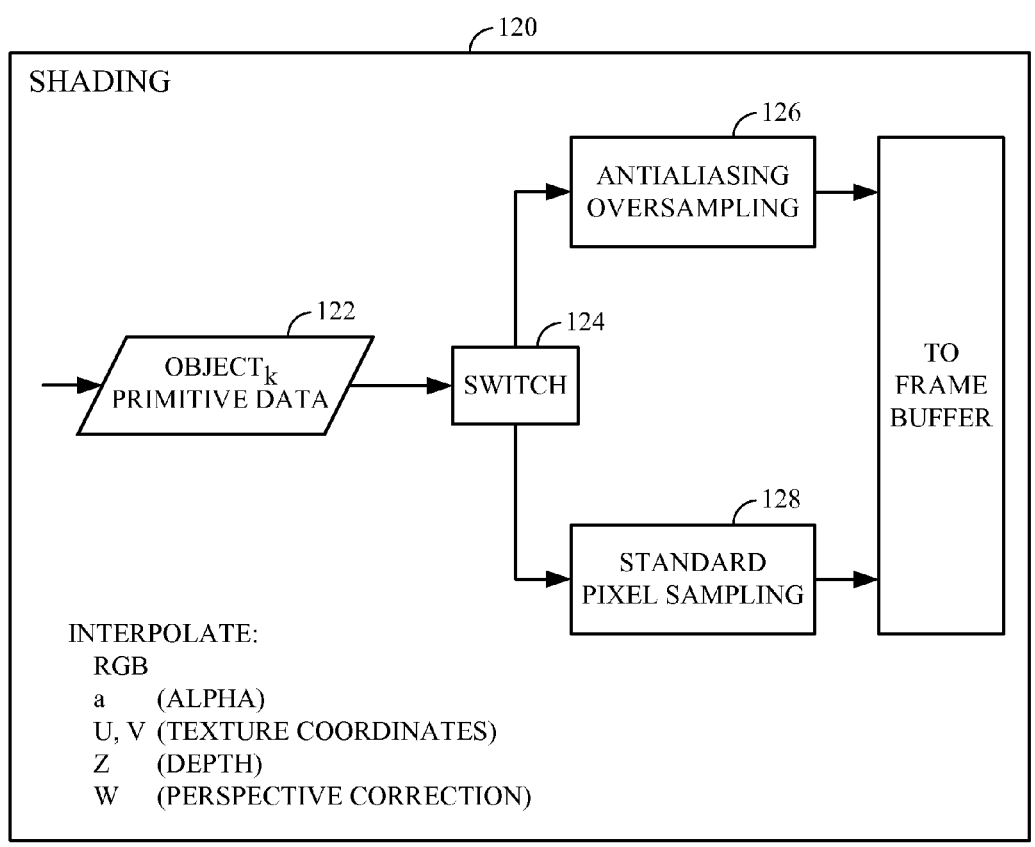
FIG. 4 is a block diagram of a shading portion of the illustrated 3D graphics pipeline.

FIG. 4 is a block diagram of an example shading portion 120 of the 3D graphics pipeline, configured to effect the per object antialiasing oversampling. The illustrated shading portion 120 comprises a switch 124 which receives a given object "object$_k$," and directs it to either antialiasing oversampling 126 or standard pixel sampling 128. The sampled values (i.e., the resulting pixel values) are forwarded to the frame buffer via a local buffer or register 130. The illustrated example shading portion 120 performs an interpolation function on information for each object (each triangle in the illustrated embodiment), calculating RGB, a (alpha), u,v (texture coordinates), z (depth), and w (perspective correction).

Switch 124 may comprise, e.g., a table lookup mechanism to lookup in a table whether the given object is to be oversampled. The given object may be specified for oversampling because it is a foreground object, thus justifying the additional bandwidth cost associated with antialiasing. It may be specified for standard pixel sampling if, e.g., it is a background object not requiring a clear a rendition. Objects may be specifically chosen for oversampling or standard pixel sampling with the use of the parameter set of the antialiasing extension, as shown in FIG. 2.

The processing performed by the system shown in the figures may be performed by a general purpose computer alone or in connection with a specialized processing computer. Such processing may be performed by a single platform or by a distributed processing platform. In addition, such processing can be implemented in the form of special purpose hardware or in the form of software being run by a general purpose computer. Any data handled in such processing or created as a result of such processing can be stored in any type of memory. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, computer-readable media may comprise any form of data storage mechanism, including such different memory technologies as well as hardware or circuit representations of such structures and of such data.

While the invention has been described with reference to certain illustrated embodiments, the words which have been used herein are words of description rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A three-dimensional (3D) graphics pipeline to render a sequence of images of 3D scenes each composed of a plural set of objects, the pipeline comprising:
   a texturing portion;
   a blending portion; and
   an antialiasing oversampling mechanism to perform for a given image, before texturing by the texturing portion, oversampling on at least a portion of the objects of the given image, wherein the antialiasing oversampling mechanism receives antialiasing parameters specified by an application program through use of an antialiasing application program interface (API) function and wherein the antialiasing parameters comprise an antialiasing sampling specification parameter to specify whether the antialiasing oversampling is to be performed per object on a specified set of objects or is to be performed on the entire image.

2. The pipeline according to claim 1, wherein the API function comprises an API extension.

3. The pipeline according to claim 1, wherein the application program is running in a memory external to the 3D graphics pipeline.

4. The pipeline according to claim 1, wherein the antialiasing oversampling is performed by the antialiasing oversampling mechanism in accordance with the received antialiasing parameters.

5. The pipeline according to claim 1, wherein the antialiasing oversampling is performed by the antialiasing oversampling mechanism on a per object basis.

6. The pipeline according to claim 1, further comprising an antialiasing weighting mechanism to perform on the given image, before texturing by the texturing portion, antialiasing weighting on the oversampled objects of the given image.

7. The pipeline according to claim 6, wherein the antialiasing weighting is performed by the antialiasing weighting mechanism after blending by a blending portion of the pipeline.

8. The pipeline according to claim 6, wherein antialiasing weighting mechanism performs an averaging operation on oversampled objects.

9. A three-dimensional (3D) graphics pipeline to render a sequence of images of 3D scenes each composed of a plural set of objects, the pipeline comprising:
   a texturing portion;
   an antialiasing oversampling mechanism to perform for a given image, at a given stage of the pipeline before texturing by the texturing portion, antialiasing oversampling on at least a portion of the objects of the given image; and
   an antialiasing weighting mechanism to perform on the given image, at the given stage of the pipeline, antialiasing weighting on the at least a portion of the given image oversampled by the antialiasing oversampling mechanism, wherein the antialiasing oversampling mechanism receives antialiasing parameters specified by an application program through use of an antialiasing application program interface (API) function and wherein said antialiasing parameters comprise at least one of (A) an antialiasing sampling specification parameter to specify whether the antialiasing oversampling is to be performed per object on a specified set of objects or is to be performed on the entire image, (B) an antialiasing weighting specification parameter to specify whether the weighting is to be performed per object on a specified set of objects or is to be performed on the entire image, or (C) an weighting timing parameter to specify whether the antialiasing weighting is to be performed before the texturing portion or after a blending portion of the pipeline.

10. The pipeline according to claim 9, wherein the API function comprises an API extension.

11. The pipeline according to claim 9, wherein the application program is running in a memory external to the 3D graphics pipeline.

12. The pipeline according to claim 9, wherein the antialiasing oversampling is performed by the antialiasing oversampling mechanism in accordance with the received antialiasing parameters.

13. The pipeline according to claim 9, wherein the antialiasing oversampling is performed by the antialiasing oversampling mechanism on a per object basis.

14. The pipeline according to claim 9, wherein the antialiasing oversampling is performed by the antialiasing oversampling mechanism on the entire given image.

15. The pipeline according to claim 9, wherein the antialiasing oversampling is performed by the antialiasing oversampling mechanism on all objects of the given image.

16. The pipeline according to claim 9, wherein the antialiasing weighting mechanism performs an averaging operation.

17. Computer-readable media encoded with at least one computer program which when executed by a processor causes antialiasing acts to be performed by a three-dimensional (3D) graphics pipeline coupled to the processor, the at least one computer program comprising:
an antialiasing application programming interface (API) function to instruct, when called by an application program, a 3D graphics pipeline to perform certain antialiasing acts, the antialiasing API function comprising a data structure to receive antialiasing parameters from the application program and to pass the antialiasing parameters received from the application program to the 3D graphics pipeline, wherein the antialiasing parameters comprise an antialiasing sampling specification parameter to specify whether upon antialiasing oversampling, the oversampling is to be performed per object on a specified set of objects or is to be performed on the entire image.

18. The computer-readable media according to claim 17, wherein the antialiasing parameters comprise an object set identification parameter to identify a set of objects of a given image to be antialiased.

19. The computer-readable media according to claim 18 wherein the object set identification parameter comprises a set of identifiers identifying individual objects from a sequence of objects making up a scene of the given image.

20. The computer-readable media according to claim 17, wherein the antialiasing parameters comprise a chosen type of antialiasing algorithm to be employed by the pipeline.

21. The computer-readable media according to claim 20, wherein the antialiasing parameters comprise parameters of the chosen type of antialiasing algorithm.

22. The computer-readable media according to claim 17, wherein the antialiasing parameters comprise an antialiasing weighting specification parameter to specify whether upon antialiasing weighting, the weighting is to be performed per object on a specified set of objects or is to be performed on the entire image.

23. The computer-readable media according to claim 22, wherein the antialiasing parameters comprising a weighting timing parameter to specify whether the antialiasing weighting is to be performed before a texturing portion of the pipeline or after a blending portion of the pipeline.

24. An embedded device comprising:
system memory;
a system bus; and
a 3D graphics core coupled to the main memory via the system bus, the 3D graphics core comprising a graphics pipeline, the graphics pipeline comprising a shading portion, a texturing portion, and a blending portion, and being configured to render a sequence of images of 3D scenes each composed of a plural set of objects;
the graphics core further comprising an antialiasing oversampling mechanism to perform for a given image, at a stage of the pipeline before texturing by the texturing portion, oversampling on at least a portion of the objects of the given image, wherein the antialiasing oversampling mechanism receives antialiasing parameters specified by an application program through use of an antialiasing application program interface (API) function and wherein the antialiasing parameters comprise an antialiasing sampling specification parameter to specify whether the antialiasing oversampling is to be performed per object on a specified set of objects or is to be performed on the entire image.

25. The embedded device according to claim 24, wherein the objects are triangles.

26. An embedded device comprising:
system memory;
a system bus; and
a 3D graphics core coupled to the main memory via the system bus, the 3D graphics core comprising a graphics pipeline, the graphics pipeline comprising a shading portion, a texturing portion, and a blending portion, and being configured to render a sequence of images of 3D scenes each composed of a plural set of objects;
the graphics core further comprising an antialiasing oversampling mechanism to perform for a given image, at a given stage of the pipeline before texturing by the texturing portion, antialiasing oversampling on at least a portion of the objects of the given image; and
the graphics core further comprising an antialiasing weighting mechanism to perform on the given image, antialiasing weighting on the portion of the given image oversampled by the antialiasing oversampling mechanism wherein a weighting timing parameter is used to specify if the antialiasing weighting mechanism is to be performed before the texturing portion or after the blending portion.

27. The embedded device according to claim 26, wherein the objects are triangles.

28. An integrated circuit comprising:
a three-dimensional (3D) graphics pipeline to render a sequence of images of 3D scenes each composed of a plural set of objects, the pipeline comprising
a texturing portion,
a blending portion, and
an antialiasing oversampling mechanism to perform for a given image, at a stage of the pipeline before texturing by the texturing portion, oversampling on at least a portion of the objects of the given image, wherein the antialiasing oversampling mechanism receives antialiasing parameters specified by an application program through use of an antialiasing application program interface (API) function and wherein the antialiasing parameters comprise an antialiasing sampling specification parameter to specify whether the antialiasing oversampling is to be performed per object on a specified set of objects or is to be performed on the entire image.

29. The integrated circuit according to claim 28, wherein the objects are triangles.

30. An integrated circuit comprising a three-dimensional (3D) graphics pipeline to render a sequence of images of 3D scenes each composed of a plural set of objects, the pipeline comprising:

a texturing portion;

an antialiasing oversampling mechanism to perform for a given image, at a given stage of the pipeline before texturing by the texturing portion, antialiasing oversampling on at least a portion of the objects of the given image; and an antialiasing weighting mechanism to perform on the given image, antialiasing weighting on the portion of the given image oversampled by the antialiasing oversampling mechanism, wherein a weighting timing parameter is used to specify if the antialiasing weighting mechanism is to be performed before the texturing portion or after the blending portion.

31. The pipeline according to claim 30, wherein the objects are triangles.

* * * * *